(12) United States Patent
Magnusson

(10) Patent No.: US 7,054,294 B2
(45) Date of Patent: May 30, 2006

(54) ORTHOGONAL VARIABLE SPREADING CODE (OVSF) ALLOCATION TELECOMMUNICATIONS NETWORK

(75) Inventor: Per Olof Magnus Magnusson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 904 days.

(21) Appl. No.: 09/995,861

(22) Filed: Nov. 29, 2001

(65) Prior Publication Data

US 2003/0099282 A1    May 29, 2003

(51) Int. Cl.
*H04B 7/216*    (2006.01)

(52) U.S. Cl. ..................................... 370/335
(58) Field of Classification Search ............... 370/342, 370/208, 209, 254, 255, 256, 320, 335
See application file for complete search history.

(56) References Cited

U.S. PATENT DOCUMENTS

| | | | |
|---|---|---|---|
| 5,751,761 A | 5/1998 | Gilhousen | |
| 6,108,369 A | 8/2000 | Ovesjö et al. | |
| 6,128,288 A | 10/2000 | Miya | |
| 6,163,524 A | 12/2000 | Magnusson et al. | |
| 6,526,065 B1 * | 2/2003 | Cheng | 370/441 |
| 6,646,579 B1 * | 11/2003 | Doetsch et al. | 341/96 |

(Continued)

FOREIGN PATENT DOCUMENTS

| | | | |
|---|---|---|---|
| DE | 198 35 643 A1 | 2/2000 | |

(Continued)

OTHER PUBLICATIONS

International Preliminary Examination Report mailed Mar. 3, 2003 in corresponding PCT application No. PCT/SE02/01964.

(Continued)

*Primary Examiner*—Kwang Bin Yao
(74) *Attorney, Agent, or Firm*—Nixon & Vanderhye, P.C.

(57) ABSTRACT

A code allocation unit (100) of a radio access telecommunications network allocates one of plural Orthogonal Variable Spreading Factor (OVSF) codes to a radio access connection for use as a channelization code. The plural Orthogonal Variable Spreading Factor (OVSF) codes are defined by a binary code tree structure having a root and plural code levels, each node of the tree corresponding to one code and having a spreading factor defined by its level (k) in the tree structure. When a code of level k=i is requested for the connection, the code allocation unit selects, to be an allocated OVSF code, a free code of the $i^{th}$ level whose subtree structure from the root of the code tree has a largest combined weight. According to the inventive technique, the code allocation unit allocates OVSF codes in a manner to enable users to operate at high data rate transmission/reception. As one aspect, allocation is performed by assigning new users to the part of the tree that contains the most number of users, thereby keeping the number of users low in other parts of the tree, and thus increasing the probability that codes of these parts of the code tree will be free for high data-rate codes. When all codes are equally weighted, the technique allocates a code based on the number of users in different subtrees, and selects the code whose subtree structure (from the root of the code tree) has the most number of users. The technique is based upon the assumption that the probability of a short term release of a presently unavailable higher level code will increase if the number of users in the codes subtree is minimized.

43 Claims, 10 Drawing Sheets

U.S. PATENT DOCUMENTS

| | | | |
|---|---|---|---|
| 2002/0051431 A1* | 5/2002 | Choi et al. | 370/331 |
| 2002/0171568 A1* | 11/2002 | Yang | 341/96 |
| 2003/0081584 A1* | 5/2003 | Heo | 370/342 |
| 6,680,902 B1* | 1/2004 | Hudson | 370/210 |
| 2002/0018457 A1* | 2/2002 | Choi et al. | 370/342 |

FOREIGN PATENT DOCUMENTS

| | | |
|---|---|---|
| WO | 95/03652 A1 | 2/1995 |
| WO | 00/54443 A1 | 9/2000 |
| WO | 00/64373 A1 | 11/2000 |
| WO | 01/35550 A1 | 5/2001 |
| WO | 01/54293 A1 | 7/2001 |

OTHER PUBLICATIONS

Tseng et al, "Code Placement and Replacement Strategies for Wideband CDMA OVSF Code Tree Management", IEEE Global Telecommunications Conference Globecom '01; San Antonio, TX, US, Nov. 25-29, 2001, vol. 1, 2001, pp. 562-566, XP002207838.

"UTRAN Lub Interface NBAP Signalling", ARIB STD-T63-25.433 V3.0.0, 'online' Jan. 1, 2001, pp. 1-9, XP002208001.

EP Search Report dated Oct. 1, 2002 with corrected U.S. Appl. No.

* cited by examiner

ORTHOGONAL VARIABLE SPREADING CODE (OVSF) ALLOCATION TELECOMMUNICATIONS NETWORK

BACKGROUND

1. Field of the Invention

The present invention pertains to wireless telecommunications, and particularly to allocation of channelization codes in a wireless telecommunications system.

2. Related Art and Other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM) developed in Europe. UTRAN is essentially a radio access network providing wideband code division multiple access (WCDMA) to user equipment units (UEs). The Third Generation Partnership Project (3GPP) has undertaken to evolve further the UTRAN and GSM-based radio access network technologies.

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". An interface between radio network controllers (e.g., between a Serving RNC [SRNC] and a Drift RNC [DRNC]) is termed the "Iur" interface.

The radio network controller (RNC) controls the UTRAN. In fulfilling its control role, the RNC manages resources of the UTRAN. Such resources managed by the RNC include (among others) the downlink (DL) power transmitted by the base stations; the uplink (UL) interference perceived by the base stations; and allocating channelization codes (e.g., downlink channelization codes).

The UTRAN interfaces (Iu, Iur and Iub) have two planes, namely, a control plane (CP) and a user plane (UP). In order to control the UTRAN, the radio network application in the different nodes communicate by using the control plane protocols. The RANAP is a control plane protocol for the Iu interface; the RNSAP is a control plane protocol for the Iur interface; and NODE B APPLICATION PART (NBAP) is a control plane protocol for the Iub interface. The control plane protocols are transported over reliable signaling bearers. The transport of data received/transmitted on the radio interface occurs in the user plane (UP). In the user plane, the data is transported over unreliable transport bearers. The serving radio network controller (SRNC) is responsible for establishing the necessary transport bearers between the serving radio network controller (SRNC) and the drift radio network controller (DRNC).

As those skilled in the art appreciate, in W-CDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

Thus, in W-CDMA, transmissions from a single source are separated by channelization codes, i.e., downlink connections within one sector and the dedicated physical channel in the uplink from one terminal (e.g., one user equipment unit). Downlink channelization codes used in W-CDMA are Orthogonal Variable Spreading Factor (OVSF) codes that preserve the orthogonality between channels of different rates and spreading factors. The OVSF codes are defined by a binary code tree structure such as that illustrated in FIG. 1. Each node of the tree corresponds to one code, whose spreading factor (SF) is defined by its level (k). As shown by FIG. 1, in W-CDMA there can be as many as nine levels, the root being of level k=0 and the lowest level (of spreading factor 256) at level k=8.

Table 1 shows various code tree relations which are utilized herein. Table 2 shows various ways to define different levels of occupation for a code (c) or a node. There are some important restrictions on how codes can be used. If a code is allocated to a call, this means that all descendant codes in that code's subtree are busy, and no other smaller spreading factor code on the path to the root of the tree can be used (they are unavailable).

TABLE 1

CODE RELATIONS

| TERMINOLOGY | MEANING |
| --- | --- |
| Level | A code has a level k that is equal to log2(SF) |
| Root | The single code that has level k = 0 |
| Parent | A code of level k is parent to a code of the next higher level k + 1 if the next higher level code is in the parent's subtree |
| Child | A code (c) is child to another code (p) if (p) is parent to (c) |
| Descendant | A code (c) is descendant to another code (p) if (p) can be found in the path from (c) to the root |

TABLE 2

LEVELS OF OCCUPATION FOR A CODE

| LEVEL | DESCRIPTION/MEANING |
| --- | --- |
| Allocated | A code itself (c) has been assigned to a call |
| Busy | The code itself has been assigned to a call or a lower level code on the path from the code to the root has been assigned to a call |
| Unavailable | The code is unavailable to assign to a call because one or more codes in the subtree to (c) are allocated |
| Free | No codes in the subtree to (c) and in the branch that leads from (c) to the tree root is busy |
| Usage | The number of codes on the highest level (k = 8 in WCDMA) in the subtree to (c) which are busy |
| Users | The number of unique codes that are allocated in the subtree to (c) |
| Weight | Every code can be assigned a weight. The weight can be related, e.g., to how long this code will be allocated (based on statistics for different types of services, individual user behavior, etc.) |
| Combined Weight | The sum of the weights for all codes that are allocated in the subtree to (c) |

In the case of W-CDMA, different services will request codes of differing Spreading Factors (SF) that match the needed rate. High data-rate users will require a Spreading Factor which block larger parts of the code tree as compared to low data-rate users.

Depending on the particular code allocation algorithm employed, the availability of high-data rate codes (i.e., codes with a low Spreading Factor) may vary considerably. Consider the example allocations of FIG. 2A and FIG. 2B in which the same amount of codes have been allocated. In FIG. 2A and FIG. 2B, the circles shown with black fill are those which have been allocated. Despite the fact that the algorithms of both FIG. 2A and FIG. 2B have allocated the same number of codes, in the code tree of FIG. 2A no higher data-rate codes are available (only codes on the lowest level). In the code tree of FIG. 2B, on the other hand, codes are available on all levels in the tree.

The simplest way to allocate OVSF codes is a sequential allocation, i.e., assigning the first available free code to a call. However, because code availability for high-data rates can be scarce, it can be important that the codes be allocated in such a manner that the availability of codes for high-data rates be maximized. To this end, other allocation approaches have been proposed, such as those described below.

Gilhousen (PCT/US94/08179, WO 95/03652) recognizes the opportunity of assigning codes that are related to busy codes in order to minimize the number of disqualified shorter-length codes. Imbeni et al. (PCT/SE00/02176, WO 01/35550A1) proffers certain pre-selected rules for allocating a code, such rules taking into consideration the availability of different codes to obtain an alleged optimum use of the code structure. These pre-selected rules work from a bottom of the code tree upwards, and select a code based on usage. Magnusson et al. (U.S. Pat. No. 6,163,524) searches up the tree until a code with a desired rate is reached, and makes selections between pairs of possible branches at every level on the basis of the branches' free bandwidths (preferring the branch with the minimum free bandwidth).

It can be expected that increased data-rates and advanced receiver techniques, as well as diversity techniques (like adaptive antennas) will make the limitation of orthogonal codes a problem in future communication systems. For this reason, algorithms that maximize the availability of orthogonal codes, especially for high data-rates, will be important. High data-rate users block a larger part of the code resource than low data-rate users. However, depending on the allocation algorithm used to allocate the codes, the availability of codes for higher data-rates will vary. Therefore, it is important to allocate codes in the code tree in such a fashion that the number of available lower level codes (low SF codes) for high data-rate calls are maximized and the need for reallocations to free up lower level codes are minimized.

If a code of a certain level k is unavailable but the maximum bit rate is not exceeded by the new code of level k, it is always possible to reallocate codes in the tree so that a code with the level k can be allocated. From a UMTS/W-CDMA point of view, the goal is to keep the number of reallocations to a minimum since signaling is needed between the node-B (base station) and the involved user equipment unit for each reallocation. Various existing allocation algorithms only perform local optimization of the code tree, which means that global optimization regarding the lower level codes (high data rate) is not performed.

What is needed, therefore, and an object of the present invention, is a technique for allocating Orthogonal Variable Spreading Factor (OVSF) codes that increases availability of codes for high data-rate users.

BRIEF SUMMARY OF THE INVENTION

A code allocation unit of a radio access telecommunications network allocates one of plural Orthogonal Variable Spreading Factor (OVSF) codes to a radio access connection for use as a channelization code. The plural Orthogonal Variable Spreading Factor (OVSF) codes are defined by a binary code tree structure having a root and plural code levels (k), each node of the tree corresponding to one code and having a spreading factor defined by its level (k) in the tree structure. When a code of level k=i is requested for the connection, the code allocation unit selects, to be an allocated OVSF code, a free code of the $i^{th}$ level whose subtree structure from the root of the code tree has a largest combined weight. The combined weight is a sum of weights for all codes that are allocated in the subtree. In one mode of the invention, the weights are values related to duration of allocation.

As one aspect of the invention, when all codes are afforded a same weight (e.g., weight=1), the code allocation unit selects, to be an allocated OVSF code, a free code of the $i^{th}$ level whose subtree structure from the root of the code tree has a greatest number of users.

According to the inventive technique, the code allocation unit allocates OVSF codes in a manner to enable users to operate at high data rate transmission/reception. Allocation is performed by assigning new users to the part of the tree that contains the largest combined weight (e.g., the most number of users when all codes have the same weight), thereby keeping the number of users low in other parts of the tree, and thus increasing the probability that codes of these parts of the code tree will be free for high data-rate codes. When all codes are equally weighted, the technique allocates a code based on the number of users in different subtrees, and selects the code whose subtree structure (from the root of the code tree) has the most number of users. The technique is based upon the assumption that the probability of a short term release of a presently unavailable higher level code will increase if the number of users in the codes subtree is minimized.

In accordance with an example implementation of a method of the invention the code allocation unit selects the allocated OVSF code by performing the steps of:
(a) setting a start code in the code tree as a current code;
(b) selecting at least one code descendant from the current code(s) on a next active code level;
(c) from the code(s) selected in step (b), selecting at least one code which has at least one code of level i available;
(d) from the code(s) selected at step (c), selecting a code(s) which has a largest combined weight;
(e) allocating one of the code(s) selected at step (d) if level thereof is level i;
(f) if the code(s) selected at step (d) is not of level i, setting the code(s) selected at step (d) as the current code(s) and continuing with step (b).

As mentioned above, the combined weight are a sum of weights for all codes that are allocated in the subtree. In certain modes, the weights can be values related, e.g., to duration of allocation. Such weights referenced are values can be statistically derived. For example, the statistically-derived weights can be based on service type or on individual user behavior.

Preferably the code allocation unit is situated in a radio network controller (RNC) node of the radio access network. Once the allocated OVSF code has been selected by the code allocation unit at the RNC node, the RNC node transmits the allocated OVSF code to a base station node (e.g., using a NODE B APPLICATION PART (NBAP) message) and transmits the allocated OVSF code to a user equipment unit (e.g., using a radio resource control (RRC) message) for use by the user equipment unit in communicating over an air interface with the base station node.

The invention concerns thus particularly a technique for allocating orthogonal variable spreading factor (OVSF) codes in a wideband code division multiplexing (W-CDMA) system.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
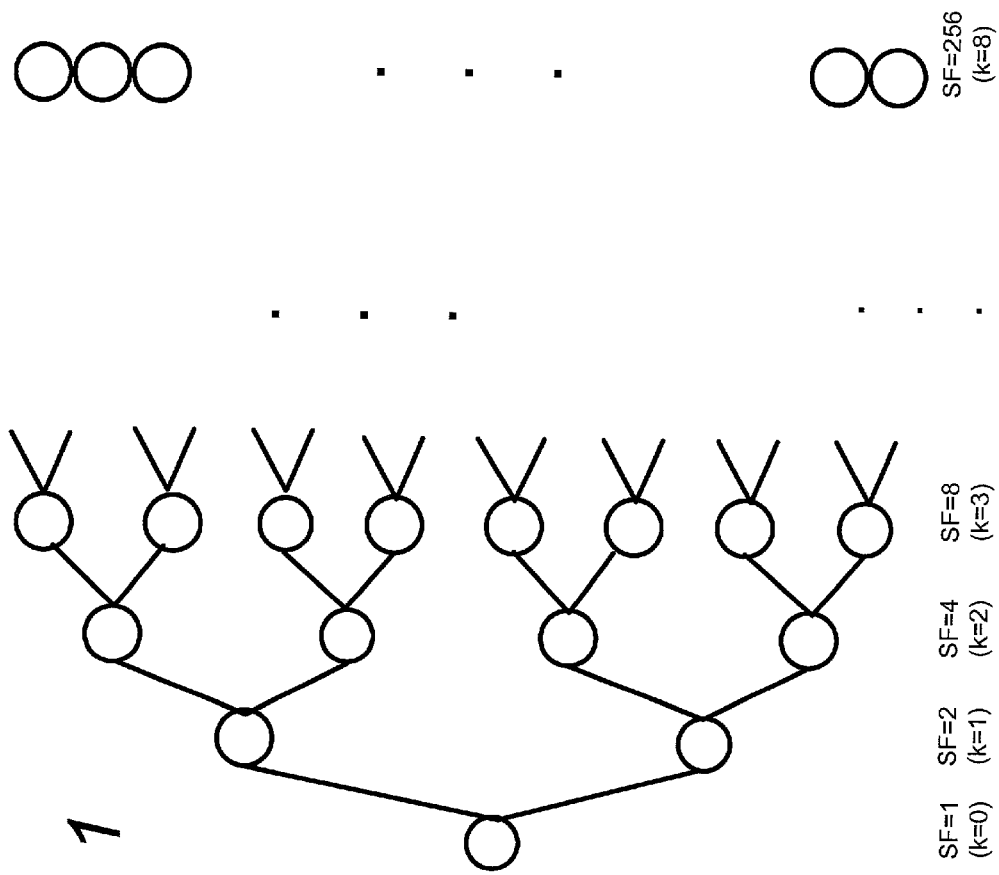
FIG. 1 is diagrammatic view of example OVSF code tree.
Figure 2B:
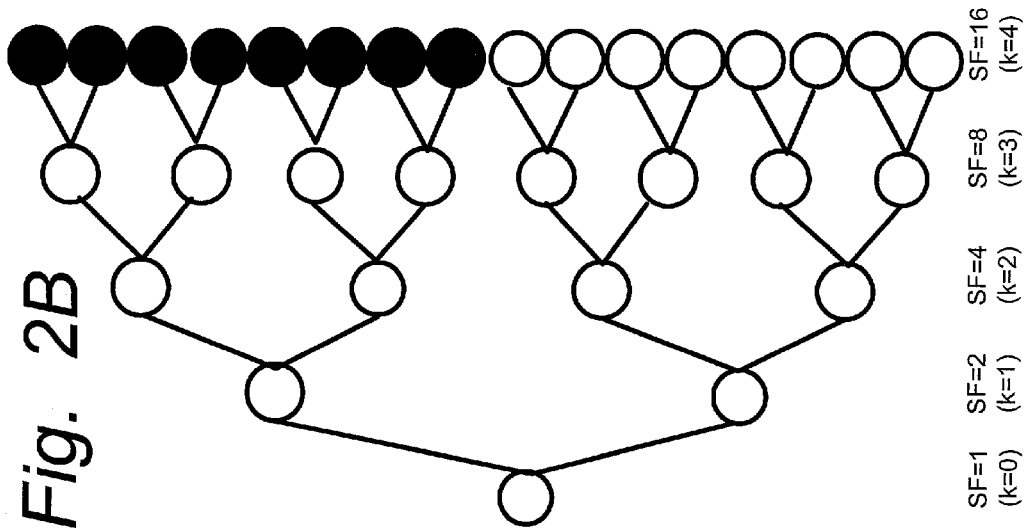
FIG. 2A and FIG. 2B are two diagrammatic views of OVSF code trees showing contrasting code allocation algorithms.
Figure 2A:
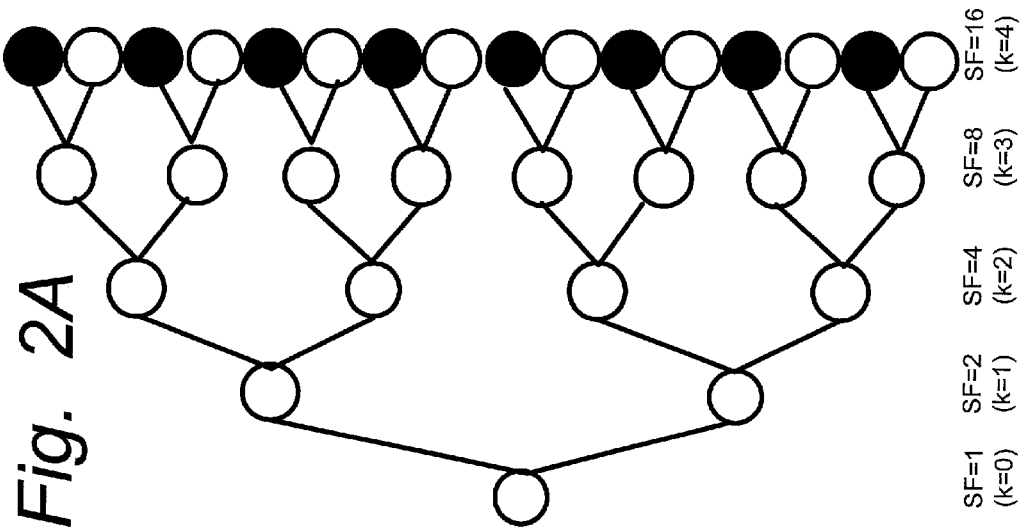
Figure 3:
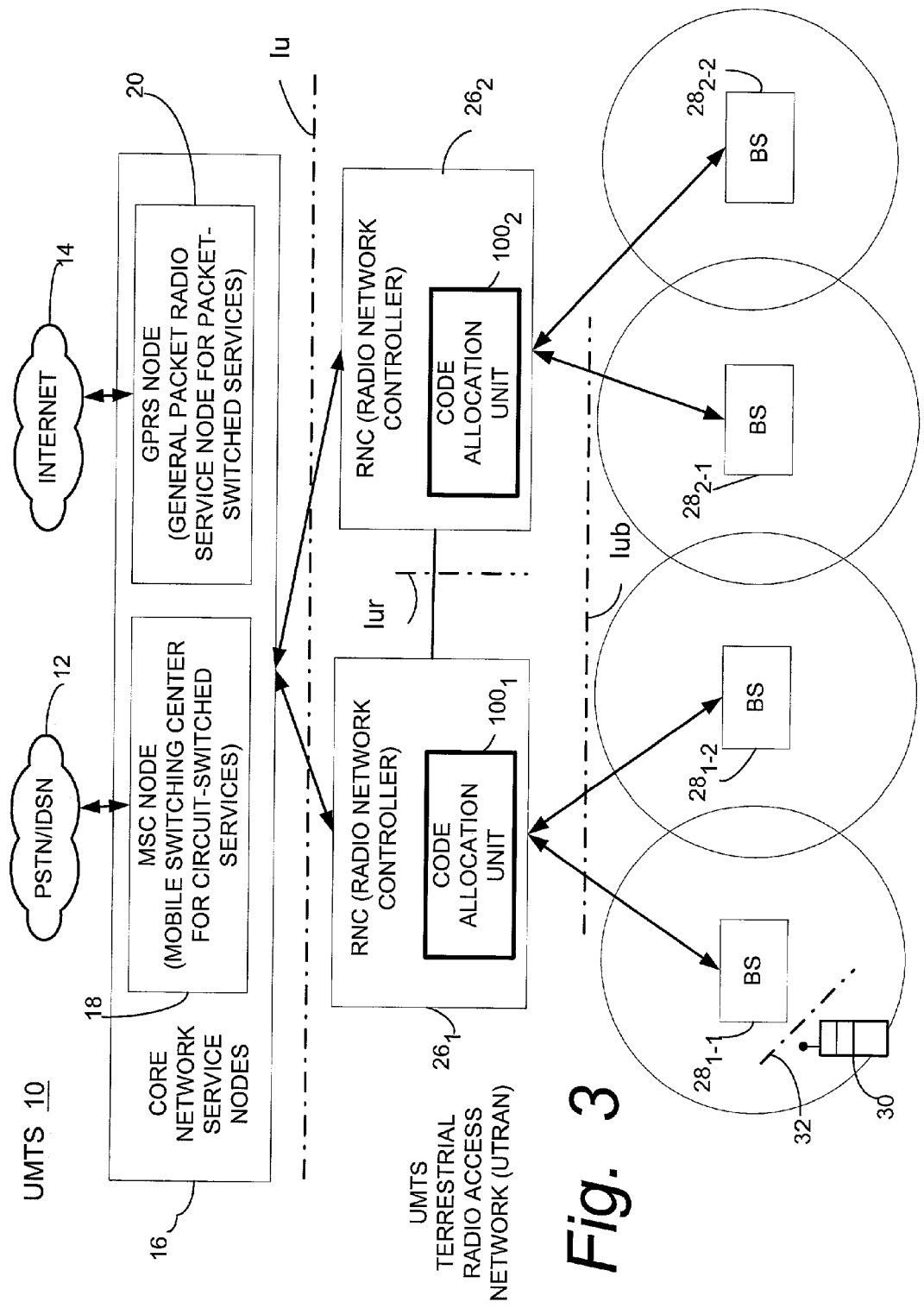
FIG. 3 is diagrammatic view of example mobile communications system in which the present invention may be advantageously employed.

The present invention is described in the non-limiting, example context of a universal mobile telecommunications (UMTS) 10 shown in FIG. 3. A representative, connection-oriented, external core network, shown as a cloud 12 may be for example the Public Switched Telephone Network (PSTN) and/or the Integrated Services Digital Network (ISDN). A representative, connectionless external core network shown as a cloud 14, may be for example the Internet. Both core networks are coupled to their corresponding service nodes 16. The PSTN/ISDN connection-oriented network 12 is connected to a connection-oriented service node shown as a Mobile Switching Center (MSC) node 18 that provides circuit-switched services. The Internet connection-less-oriented network 14 is connected to a General Packet Radio Service (GPRS) node 20 tailored to provide packet-switched type services which is sometimes referred to as the serving GPRS service node (SGSN).

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 3 is shown with only two RNC nodes, particularly RNC 26$_1$ and RNC 26$_2$. Each RNC 26 is connected to a plurality of base stations (BS) 28. For example, and again for sake of simplicity, two base station nodes are shown connected to each RNC 26. In this regard, RNC 26$_1$ serves base station 28$_{1-1}$ and base station 28$_{1-2}$, while RNC 262 serves base station 28$_{2-1}$ and base station 28$_{2-2}$. It will be appreciated that a different number of base stations can be served by each RNC, and that RNCs need not serve the same number of base stations. Moreover, FIG. 3 shows that an RNC can be connected over an Iur interface to one or more other RNCs in the URAN 24. Further, those skilled in the art will also appreciate that a base station is sometimes also referred to in the art as a radio base station, a node B, or B-node.

In the illustrated embodiments, for sake of simplicity each base station 28 is shown as serving one cell. Each cell is represented by a circle which surrounds the respective base station. It will be appreciated by those skilled in the art, however, that a base station may serve for communicating across the air interface for more than one cell. For example, two cells may utilize resources situated at the same base station site. Moreover, each cell may be divided into one or more sectors, with each sector having one or more cell/carriers.

A user equipment unit (UE), such as user equipment unit (UE) 30 shown in FIG. 3, communicates with one or more cells or one or more base stations (BS) 28 over a radio or air interface 32. Each of the radio interface 32, the Iu interface, the Iub interface, and the Iur interface are shown by dash-dotted lines in FIG. 3.

Figure 4:
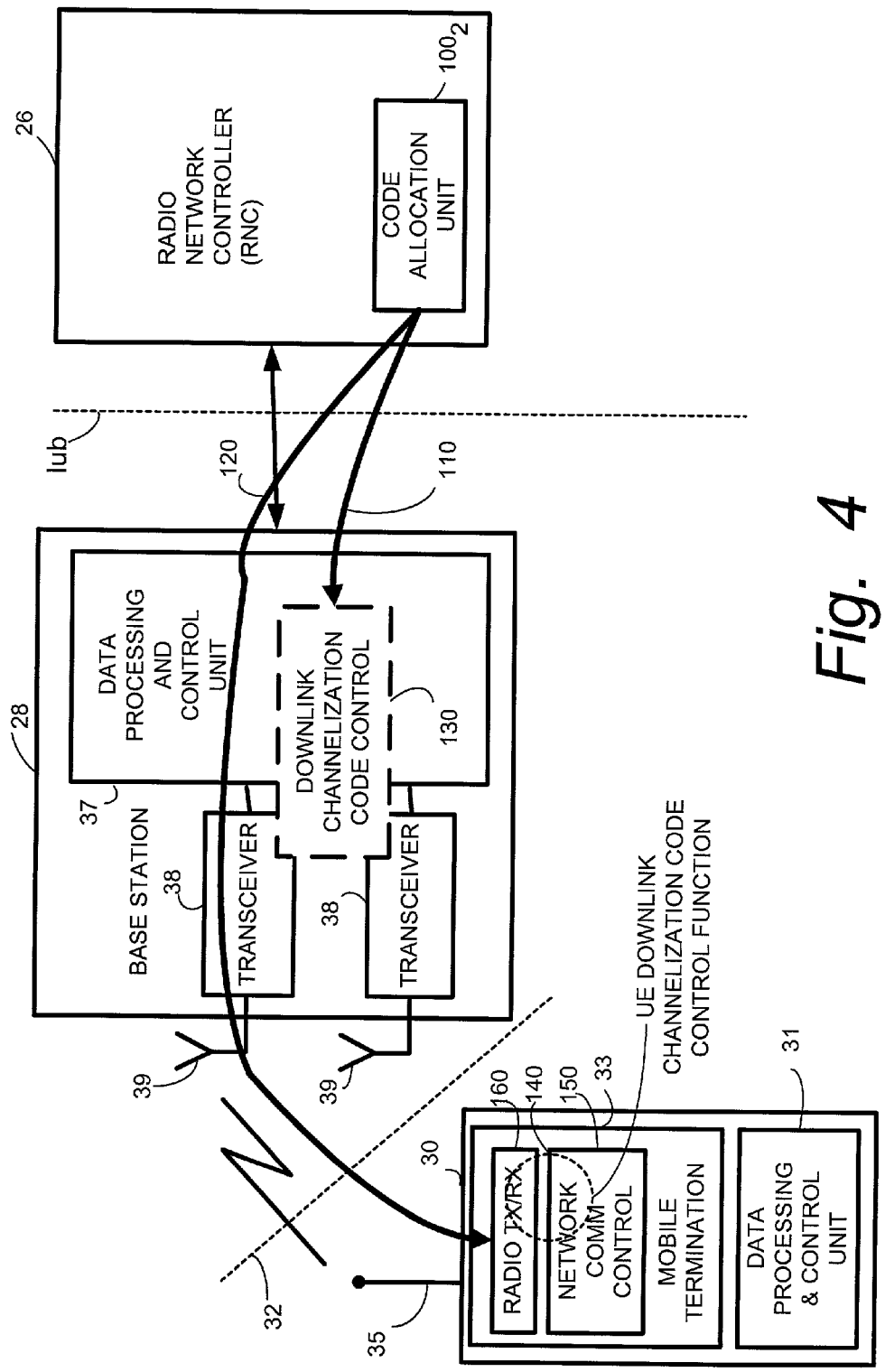
FIG. 4 is a simplified function block diagram of a portion of a UMTS Terrestrial Radio Access Network, including a user equipment unit (UE) station; a radio network controller; and a base station.

FIG. 4 shows selected general aspects of user equipment unit (UE) 30 and illustrative nodes such as radio network controller 26 and base station 28. The user equipment unit (UE) 30 shown in FIG. 4 includes a data processing and control unit 31 for controlling various operations required by the user equipment unit (UE). The UE's data processing and control unit 31 provides control signals as well as data to a mobile termination (MT) part 33 connected to an antenna 35.

The example radio network controller 26 and base station 28 as shown in FIG. 4 are radio network nodes that each include a corresponding data processing and control unit 36 and 37, respectively, for performing numerous radio and data processing operations required to conduct communications between the RNC 26 and the user equipment units (UEs) 30. Part of the equipment controlled by the base station data processing and control unit 37 includes plural radio transceivers 38 connected to one or more antennas 39.

Radio access is based upon Wideband Code Division Multiple Access (W-CDMA) with individual radio channels allocated using CDMA spreading codes. W-CDMA provides wide bandwidth for multimedia services and other high transmission rate demands as well as robust features like diversity handoff and RAKE receivers to ensure high quality.

It is the allocation of CDMA spreading codes, and particularly the allocation of Orthogonal Variable Spreading Factor (OVSF) codes to which the present invention pertains. To this end, the radio network controllers 26$_1$ and 26$_2$ in the network of FIG. 3, and the generalized radio network controller 26 of FIG. 4, are shown as comprising a code allocation unit 100. In accordance with the present invention, and in the manner described in more detail hereinafter, the code allocation unit 100 allocates one of plural Orthogonal Variable Spreading Factor (OVSF) codes to a radio access connection for use as a channelization code. The code allocation unit 100 is invoked to allocate and release the OVSF code at various occasions, such as (for example) initiation of a connection, handover between cells, reconfiguration of a connection, and termination of a connection.

As previously described, the plural Orthogonal Variable Spreading Factor (OVSF) codes are defined by a binary code tree structure having a root, each node of the tree corresponding to one code and having a spreading factor defined by its level (k) in the tree structure. When a code of level k=i is requested for the connection, the code allocation unit 100 of the present invention selects, as an allocated OVSF code, a free code of the $i^{th}$ level whose subtree structure from the root of the code tree has a largest combined weight. The combined weight is a sum of weights for all codes that are allocated in the subtree. In certain modes of the invention, the weights can be values related, e.g., to duration of allocation. As one aspect of the invention, when all codes are afforded a same weight (e.g., weight=1), the code allocation unit selects, to be an allocated OVSF code, a free code of the $i^{th}$ level whose subtree structure from the root of the code tree has a greatest number of users.

The inventive technique implemented by the code allocation unit 100 allocates OVSF codes in a manner to enable users to operate at high data rate transmission/reception. For example, allocation is performed by assigning new users to the part of the tree that contains the most number of users, thereby keeping the number of users low in other parts of the tree, and thus increasing the probability that the codes of these parts of the tree will be free for high data-rate codes. Thus, in one of its aspects, the technique allocates a code based on the number of users in different subtrees, and selects the code whose subtree structure (from the root of the code tree) has the most number of users. The technique is based upon the assumption that the probability of a short term release of a presently unavailable higher level code will increase if the number of users in the codes subtree is minimized.

Figure 7:
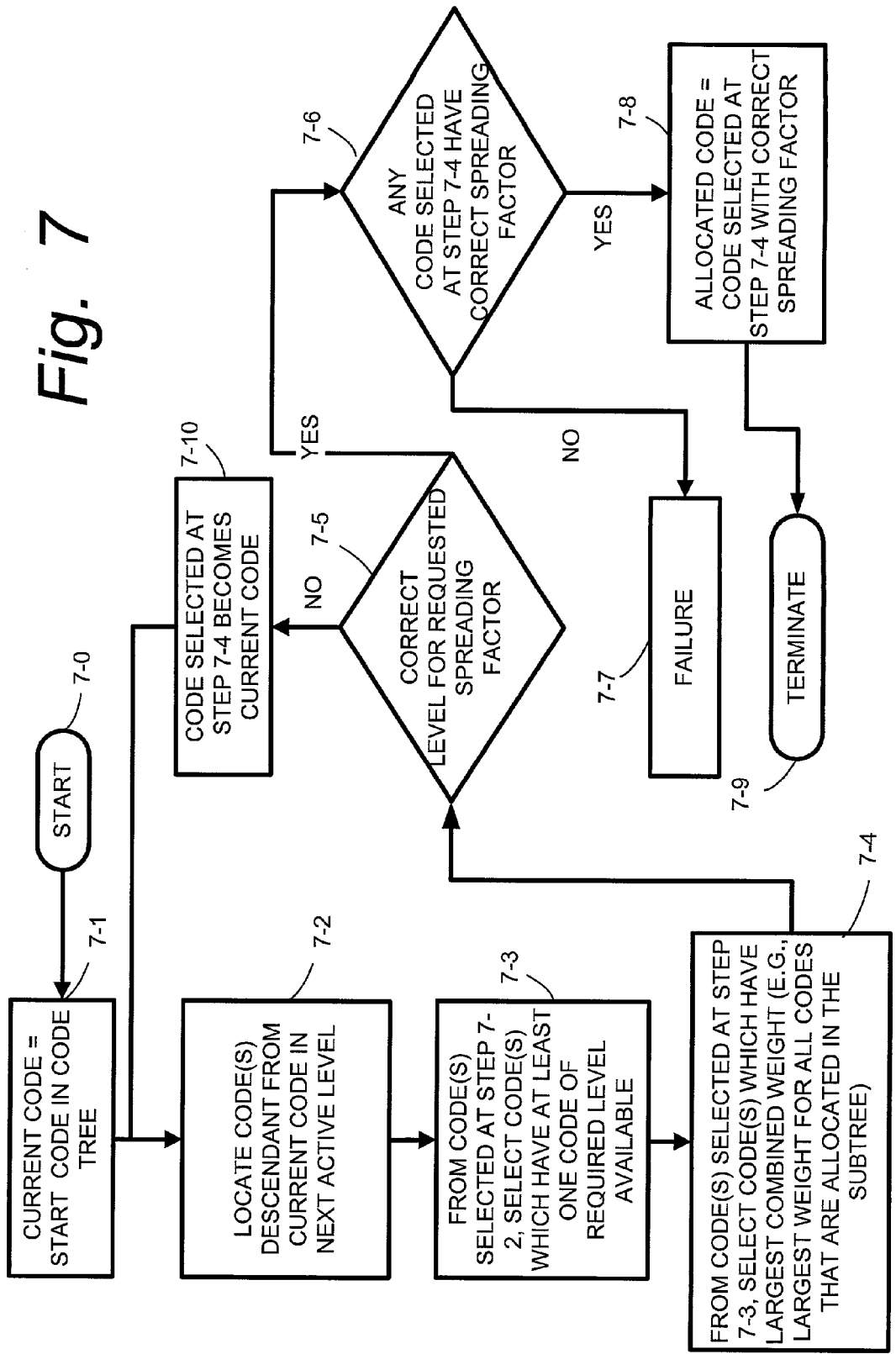
FIG. 7 is a flowchart showing representative, basic steps involved in a method of allocating an Orthogonal Variable Spreading Factor (OVSF) code in accordance with one example mode of the invention.

FIG. 7 illustrates an example implementation of a method of the invention, including basic representative steps performed by code allocation unit 100 in selecting an allocated OVSF code for a connection. As step 7-1, the code allocation unit 100 sets a start code in the code tree as a current code. In the illustrated embodiment, it happens that the start code is a root code (k=0). Then, as step 7-2, the code allocation unit 100 locates or selects one or more codes (but at least one code) which is a descendant of the current code and which resides on a next active code level. The "next active level" is now considered the "examined level" of the code tree. By "next active code level" is meant a next level of the code tree (working up the tree from the start code) where codes can possibly be allocated. In this regard, in some applications codes are only allocated on some levels in a tree, and in those applications the invention focuses on optimizing code availability on these levels while ignoring other levels.

As step 7-3, the code allocation unit 100 selects or determines, from the code(s) selected in step 7-2, one or more codes which have at least one code of level i available (e.g., at least one code which has the required spreading factor available).

At step 7-4, the code allocation unit 100 selects, from the codes found at step 7-3, one or more codes at the examined level which have a largest combined weight. In other words, at step 7-4 the code allocation unit 100 selects the code having the largest weight for all codes that are allocated in the subtree.

The concept of "combined weight" as employed in step 7-4 of FIG. 7 is understood with respect to Table 2. Briefly, the combined weight is a sum of weights for all codes that are allocated in the subtree. The weights can be, for example, values related to duration of allocation. The weights referenced in step 7-4 are values related to duration of allocation and, in at least one example implementation, can be statistically derived. For example, the statistically-derived weights can be based on service type or on individual user behavior.

As step 7-5, the code allocation unit 100 checks whether the examined level is the correct level (e.g., the level of a code of the required/requested spreading factor). If the examined level is the correct level, a check is made at step 7-6 whether one or more codes of the correct level was found at step 7-4. If no code of the correct level was found as determined at step 7-6, as step 7-7 a code allocation failure is signaled. But if one or more codes selected at step 7-4 are of the correct level as determined at step 7-6, then one of the codes selected at step 7-4 is chosen to be the allocated OVSF code (step 7-8) and the allocation process terminates (step 7-9). In the case that plural codes are selected at step 7-4, the invention utilizes some rule or criteria or predetermined strategy for determining which of the selected codes is to be allocated, e.g., a predetermined strategy of allocating the first of such codes selected at step 7-4.

If it is determined at step 7-5 that the examined level is not yet the correct level, as step 7-10 the code allocation unit 100 sets the code(s) selected at step 7-4 as the current code(s), and loops back to step 7-2. Reiteration of the loop (comprising, e.g., steps 7-2 through 7-6) occurs until either a failure is detected (step 7-7) or an OVSF code is chosen to be the allocated OVSF code (at step 7-8).

Figure 7A:
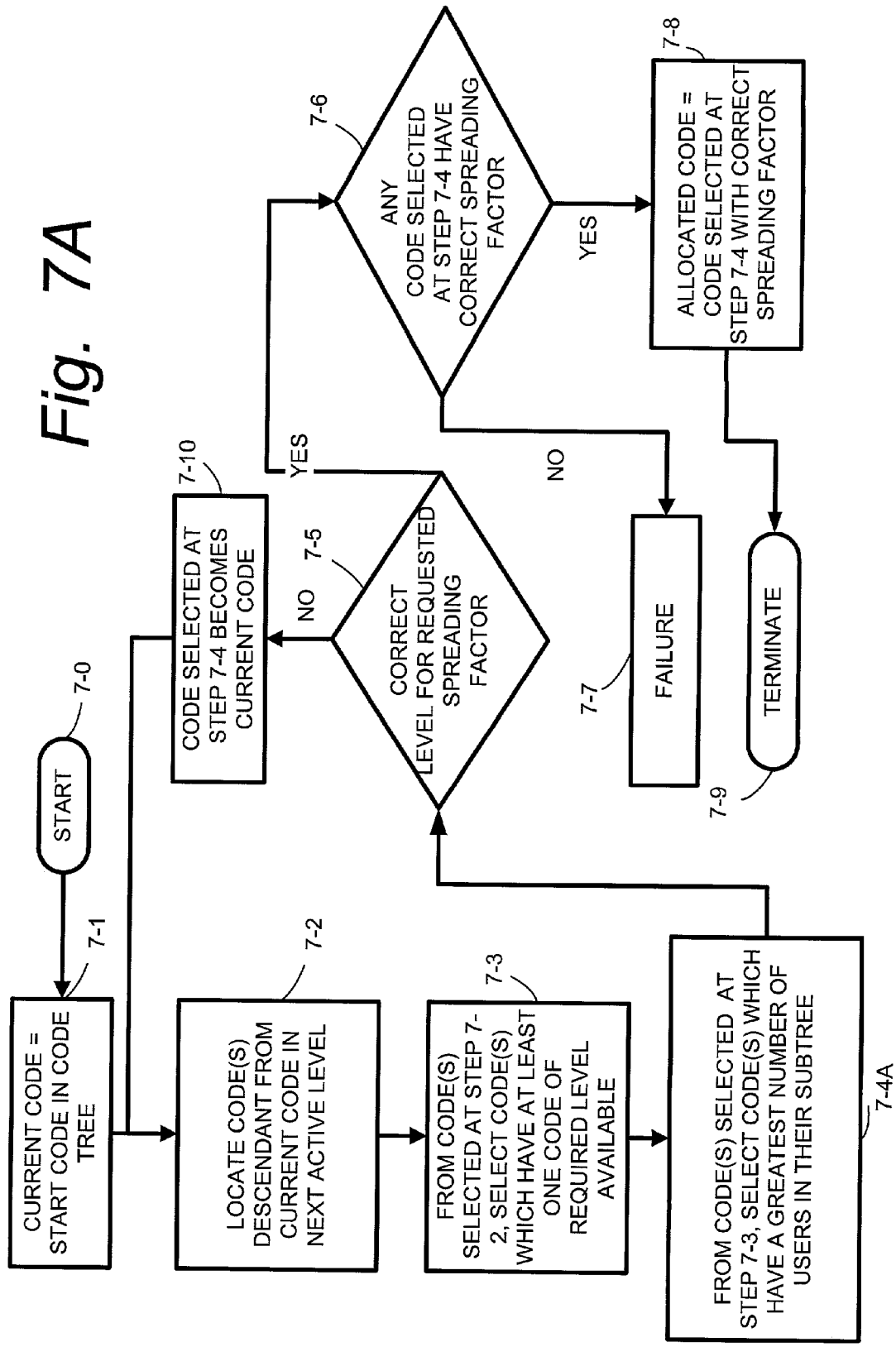
FIG. 7A is a flowchart showing representative, basic steps involved in a method of allocating an Orthogonal Variable Spreading Factor (OVSF) code in accordance with a second example mode of the invention.

A specific case of the method of FIG. 7 is shown in a mode illustrated in FIG. 7A. The specific case of FIG. 7A is the situation in which all codes are equally weighted (e.g., each code has weight=1). The mode illustrated in FIG. 7A differs primarily from the mode of FIG. 7 by having step 7-4A substituted for step 7-4. At step 7-4A, the code allocation unit determines, from the codes selected at step 7-3, which code(s) has a greatest number of users in their subtrees.

Preferably the node which allocates the Orthogonal Variable Spreading Factor (OVSF) codes is a radio network controller (RNC) node of the radio access network. Once the allocated OVSF code has been selected by the RNC node (e.g., at step 7-8 in FIG. 7), the RNC node transmits the allocated OVSF code to a base station node and to the user equipment unit involved in the connection. In this regard, FIG. 4 shows the radio network controller (RNC) 26 transmitting the allocated OVSF code to a downlink channelization code control function 130 of base station (BS) 28 in a message 110. Further, FIG. 4 shows radio network controller (RNC) 26 transmitting the allocated OVSF code to a downlink channelization code control function 140 of user equipment unit 30 in a message 120.

In one example implementation, the message 110 by which the radio network controller (RNC) 26 transmits the allocated OVSF code to base station (BS) 28 is a Node B Application Part (NBAP) message. Examples of appropriate NBAP messages in which the allocated OVSF code can be transmitted from radio network controller (RNC) 26 to base station (BS) 28 are the following NBAP messages: COMMON TRANSPORT CHANNEL SETUP REQUEST message; CELL SETUP REQUEST message; RADIO LINK SETUP REQUEST message; RADIO LINK ADDITION REQUEST message; RADIO LINK RECONFIGURATION PREPARE message, and COMPRESSED MODE PREPARE message.

In the same example implementation, the message 120 by which the radio network controller (RNC) 26 transmits the allocated OVSF code to downlink channelization code control function 140 of user equipment unit 30 is a radio resource control (RRC) message. Examples of appropriate RRC messages in which the allocated OVSF code can be transmitted from radio network controller (RNC) 26 to user equipment unit 30 are the following RRC messages: PHYSICAL CHANNEL RECONFIGURATION message; TRANSPORT CHANNEL RECONFIGURATION message; RADIO BEARER SETUP message; RADIO BEARER RELEASE message; RADIO BEARER RECONFIGURATION message; RADIO RESOURCE CONTROL (RRC) CONNECTION SETUP message; ACTIVE SYSTEM UPDATE message; and SYSTEM INFORMATION message.

Figure 5:
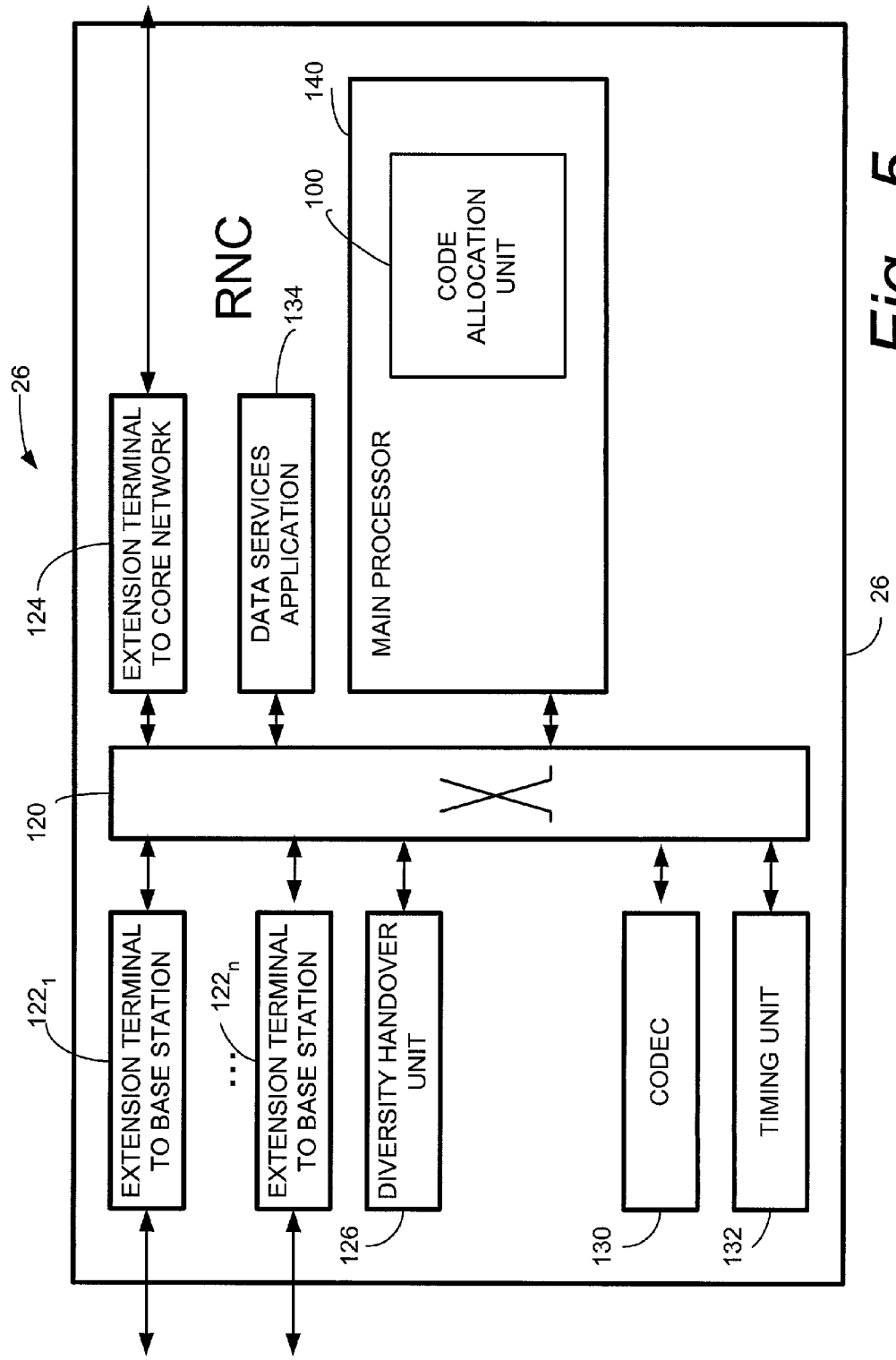
FIG. 5 is a schematic view of an example RNC node in accordance with one embodiment of the invention.

FIG. 5 illustrates, in somewhat more detail, an example non-limiting RNC node 26 of the present invention. It so happens that the RNC node 26 of FIG. 5 is a switched-based node having a switch 120. The switch 120 serves to interconnect other constituent elements of RNC node 26. Such other constituent elements include extension terminals $122_1$ through $122_n$, as well as extension terminal 124. Extension terminals $122_1$ through $122_n$ essentially function to connect RNC node 26 to the base stations 28 served by RNC node 26; extension terminal 124 connects RNC node 26 across the Iu interface to the core network.

Yet other constituent elements of RNC node 26 include diversity handover unit 126; codec 130; timing unit 132; a data services application unit 134; and, a main processor 140. In an example implementation, the function of code allocation unit 100 is performed by main processor 140. It should be understood, however, that the function of code allocation unit 100 may be implemented in various ways, including (for example) using individual hardware circuits, using software functioning in conjunction with a suitably programmed digital microprocessor or general purpose computer, using an application specific integrated circuit (ASIC), and/or using one or more digital signal processors (DSPs).

Figure 6:
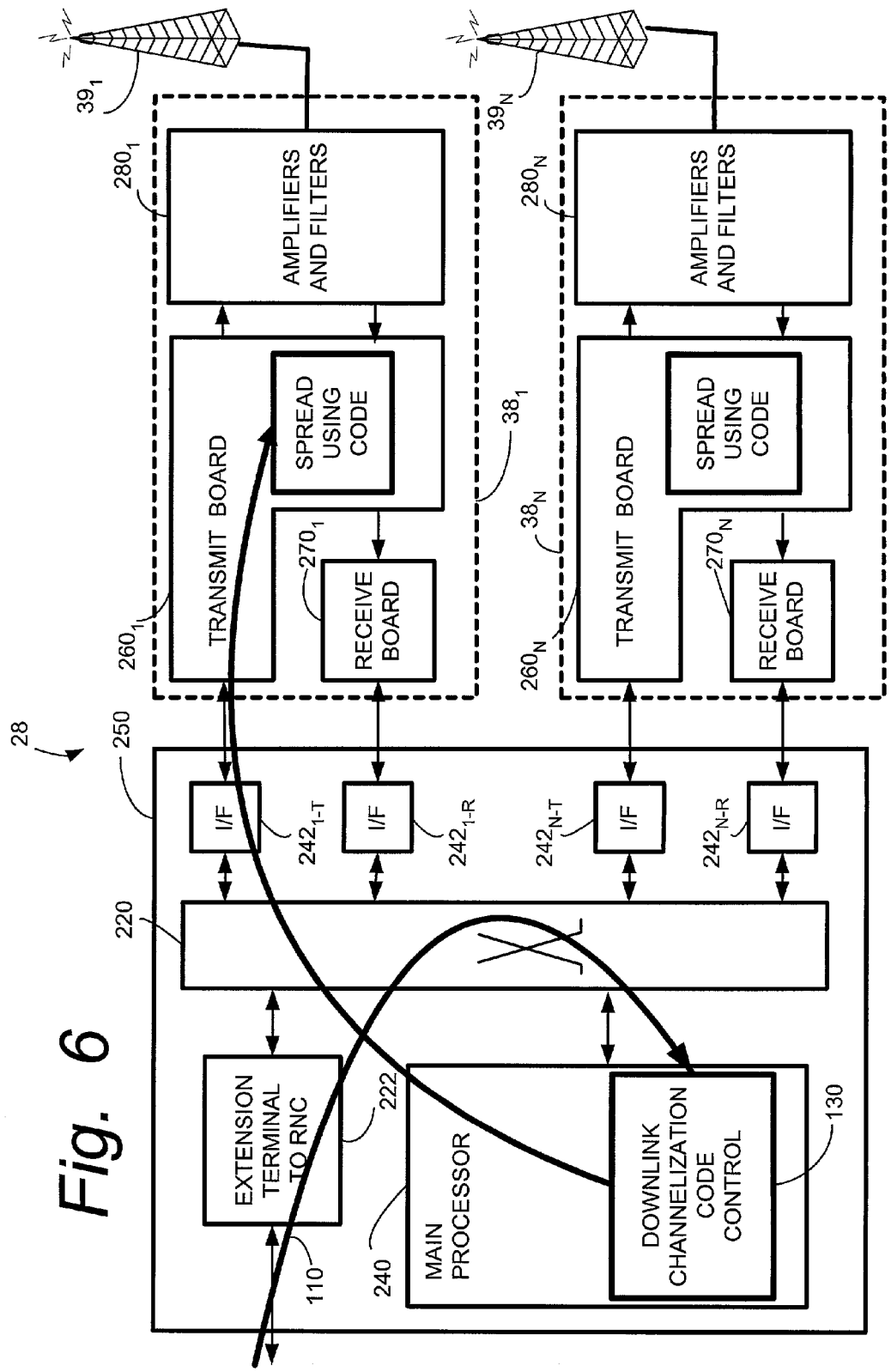
FIG. 6 is a schematic view of an example base station node in accordance with one embodiment of the invention.

FIG. 6 illustrates, in non-limiting manner, more details of an example base station (BS) node 28 (e.g., node-B) in accordance with one embodiment of the present invention. As with RNC node 26, the base station (BS) node 28 of FIG. 6 is a switched-based node having a switch 220 which serves to interconnect other constituent elements of base station (BS) node 28. Such other constituent elements include extension terminal 222; BS main processor 240, and interface boards 242. Extension terminal 222 connects base station (BS) node 28 to radio network controller (RNC) node 26, and thus comprises the Iub interface.

The embodiment of base station (BS) node 28 illustrated in FIG. 6 is housed in a rack having multiple subracks. Each subrack has one or more boards, e.g., circuit boards, mounted thereon. A first subrack 250 contains boards for each of extension terminal 222, BS main processor 240, and interface boards 242. Each of the interface boards 242 is connected to a board on another subrack, e.g., one of the transmitter boards 260 or one of the receiver boards 270. Each receiver board 270 is connected to share certain transmitter/receiver resources in a corresponding transmitter board 260, with the transmitter board 260 being connected to a corresponding one of amplifiers and filters board 280. The amplifiers and filters board 280 is connected to an appropriate antenna 39. For example, interface board 242$_{1\text{-}T}$ is connected to transmitter board 260$_1$, while interface board 242$_{1\text{-}R}$ is connected to receiver board 270$_1$. The pair of transmitter board 260$_1$ and receiver board 270$_1$ is, in turn, connected to amplifiers and filters board 280$_1$. Similar connections exist for a second pairing of transmitter board 260$_2$ and receiver board 270$_2$, which interface via interface board 242$_{2\text{-}T}$ and interface board 242$_{2\text{-}R}$, respectively. Each transceiver 38 of FIG. 4 thus comprises a subrack which includes a transmitter board 260, a receiver board 270, and amplifiers and filters board 280.

In one example embodiment, base station (BS) node 28 is an ATM-based node, with interface boards 242 performing various ATM interfacing functions. The transmitter boards 260 and receiver boards 270 each include several devices. For example, each transmitter board 260 includes unillustrated elements such as an interface connected to its corresponding interface board 242; an encoder; a modulator; and, a baseband transmitter. In addition, the transmitter board 260 includes the transmitter/receiver resources which it shares with receiver board 270, including a radio frequency transmitter. Each receiver board 270 includes unillustrated elements such as an interface connected to its corresponding interface board 242; a decoder; a demodulator; and, a baseband receiver. Each amplifiers and filters board 280 includes amplifiers, such as MCPA and LNA amplifiers.

In an example embodiment, the channelization code control function 130 which receives the message 110 including the allocated OVSF code transmitted from code allocation unit 100 resides in the main processor 240 and in the transmit board 260 of base station (BS) 28. As shown in FIG. 6, the main processor 240 receives the messages 110 from the base station (BS) 28, and communicates the allocated OVSF code to the transmit board 260 which spreads the physical channel data to chip data.

As shown in FIG. 4, the downlink channelization code transmitted from code allocation unit 100 to user equipment unit 30 in message 120 is applied to downlink channelization code control function 140 of user equipment unit 30. In particular, the downlink channelization code transmitted from code allocation unit 100 are received at network communication control unit 150 of user equipment unit (UE) 30 via radio TX/RX unit 160. The network communication control unit 150 then sends the allocated OVSF code to the TX/RX unit 160 to be used by the radio TX/RX unit 160 for despreading chip data to physical channel data.

The code allocation unit 100 of the present invention thus uses a top to bottom approach, relative to the code tree. This top to bottom approach starts at the root of the tree and iterates downwards level by level. Only those levels where codes possibly can be allocated are evaluated (e.g., at step 7-2). At each level, the best code(s) are selected, e.g., those code(s) that have the most number of users (see, e.g., step 7-4 in the FIG. 7 mode and step 7-4 in the FIG. 7A mode). This/these code(s) are passed as input to the next level evaluation until the level of the code tree is reached that matches the requested spreading factor (step 7-5). If at least one available code has been found, the first of those available codes is returned and the procedure of FIG. 7 is exited.

Figure 8:
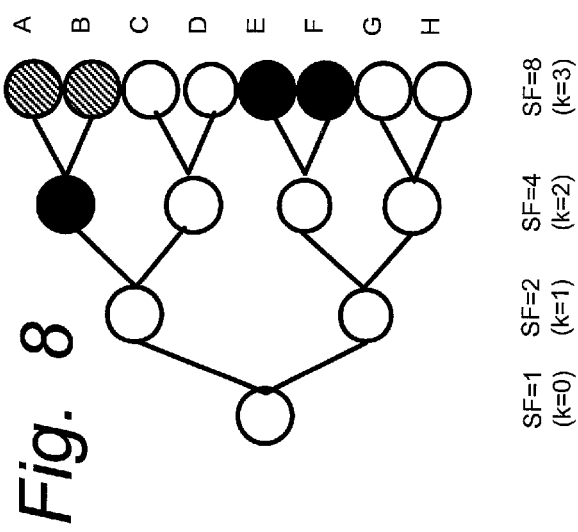

FIG. 8 shows a first example scenario of orthogonal variable spreading factor (OVSF) allocation according to the procedure of FIG. 7A. In FIG. 8, the black-filled circles (e.g., codes AB, E, and F) represent allocated codes; circles with cross-hatched interiors (e.g., codes A, B) represent busy codes. In the scenario of FIG. 8, it is assumed that an incoming call (e.g., an incoming connection) requires a spreading factor of 8 (e.g., SF=8), which means that a code of level k=3 is required. The code tree of the scenario of FIG. 8 contains four free codes of level k=3, particularly the codes C, D, G, and H. In the scenario of FIG. 8, it is further assumed that levels k=1, 2, and 3 are active levels (i.e., it is possible to allocate codes on these levels) and that the weight=1 for all codes.

In accordance with the procedure of FIG. 7A and in the context of the FIG. 8 scenario, as step 7-2 the code allocation unit 100 starts on level k=1 for a first iteration. As step 7-4, at level k=1 the code allocation unit 100 selects the code EFGH over the code ABCD because the code EFGH has two users (e.g., users of codes E, F), whereas code ABCD has only one user (the user of code AB). When it is determined at step 7-5 that level k=1 is not the correct level corresponding to the requested spreading factor of 8 (e.g., level k=3 has not yet been reached), the code EFGH becomes the current code at step 7-10, and a second iteration of the procedure of FIG. 7A is performed.

In the second iteration of FIG. 7 using code EFGH as the current code of the FIG. 8 scenario, the codes at level k=2 are examined, e.g., code EF and code GH. At step 7-3 of the second iteration, the code GH is selected since the code GH is the only code on the second level (k=2) which has free codes on level 3. When it is determined at step 7-5 that level k=2 is not the correct level corresponding to the requested spreading factor of 8 (e.g., level k=3 has not yet been reached), the code GH becomes the current code at step 7-10, and a third iteration of the procedure of FIG. 7A is performed.

In the third iteration of FIG. 7A using code GH as the current code in the scenario of FIG. 8, the codes at level k=3 (the child codes to code GH) are examined, e.g., code G and code H. At step 7-4 the code allocation unit 100 selects the first available code, e.g., code G, because both level 3 codes have the same number of users, e.g., zero number of users. When it is determined at step 7-5 that level k=3 is the correct level corresponding to the requested spreading factor of 8 (e.g., level k=3 has now been reached), the code G becomes the allocated code at step 7-8 and the procedure as applied to the scenario of FIG. 8 terminates.

Figure 9:
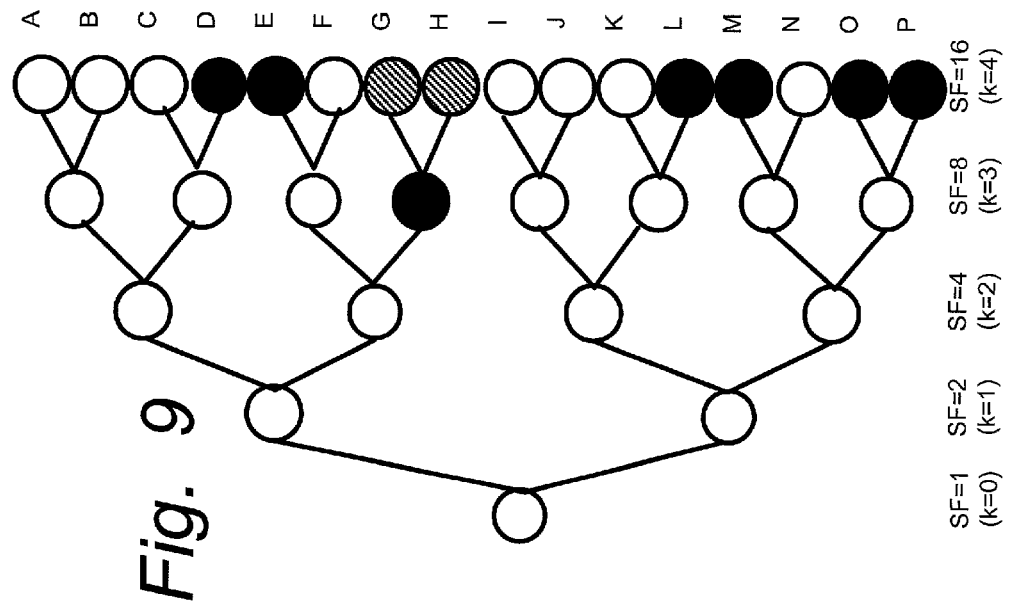
FIG. 8, FIG. 9, and FIG. 10 are diagrammatic views showing example scenarios of code allocation according to a method of the present invention.

FIG. 9 shows a second example scenario of orthogonal variable spreading factor (OVSF) allocation according to the procedure of FIG. 7A. Again in FIG. 9, the black-filled circles (e.g., codes D, E, GH, L, M, O, and P) represent allocated codes; circles with cross-hatched interiors (e.g., codes G, H) represent busy codes. In the scenario of FIG. 9 it is assumed that an incoming call (e.g., an incoming connection) requires a spreading factor of 16 (e.g., SF=16), which means that a code of level k=4 is required. The code tree of the scenario of FIG. 9 contains eight free codes of level k=4, particularly the codes A, B, C, F, I, J, K, and N. In the scenario of FIG. 9, it is further assumed that it possible to allocate codes on level k=1, 2, 3, and 4, and that the weight=1 for all codes.

In accordance with the procedure of FIG. 7A and in the context of the FIG. 9 scenario, as step 7-2 the code allocation unit 100 starts on level k=1 for a first iteration. As step 7-4, at level k=1 the code allocation unit 100 selects the code IJKLMNOP over the code ABCDEFGH because the code IJKLMNOP has four users (e.g., users of codes L, M, O, and P), whereas code ABCDEFGH has only three users (the user of codes D, E, and GH). When it is determined at step 7-5 that level k=1 is not the correct level corresponding to the requested spreading factor of 16 (e.g., level k=4 has not yet been reached), the code IJKLMNOP becomes the current code at step 7-10, and a second iteration of the procedure of FIG. 7 is performed.

In the second iteration of FIG. 7A using code IJKLMNOP as the current code of the FIG. 9 scenario, the codes at level k=2 are examined, e.g., code IJKL and code MNOP. At step 7-3 of the second iteration, the code MNOP is selected since the code MNOP has three users, whereas the code IJKL has only one user (the user of code L). When it is determined at step 7-5 that level k=2 is not the correct level corresponding to the requested spreading factor of 16 (e.g., level k=4 has not yet been reached), the code MNOP becomes the current code at step 7-10, and a third iteration of the procedure of FIG. 7A is performed.

In the third iteration of FIG. 7A using code MNOP as the current code in the scenario of FIG. 9, the codes at level k=3 (the child codes to code MNOP) are examined, e.g., code MN and code OP. At step 7-4 the code allocation unit 100 selects code MN, because it is the only code that has at least one free code. When it is determined at step 7-5 that level k=3 is not the correct level corresponding to the requested spreading factor of 16 (e.g., level k=4 has not yet been reached), the code MN becomes the current code at step 7-10, and a fourth iteration of the procedure of FIG. 7A is performed.

In the fourth iteration of FIG. 7A using code MN as the current code in the scenario of FIG. 9, the codes at level k=4 (the child codes to code MN) are examined, e.g., code M and code N. At step 7-3 code N is selected because it is the only code that is free. Then, when it is determined at step 7-5 that level k=4 is the correct level corresponding to the requested spreading factor of 16 (e.g., level k=4 has now been reached), the code N becomes the allocated code at step 7-8 and the procedure as applied to the scenario of FIG. 9 terminates.

Figure 10:
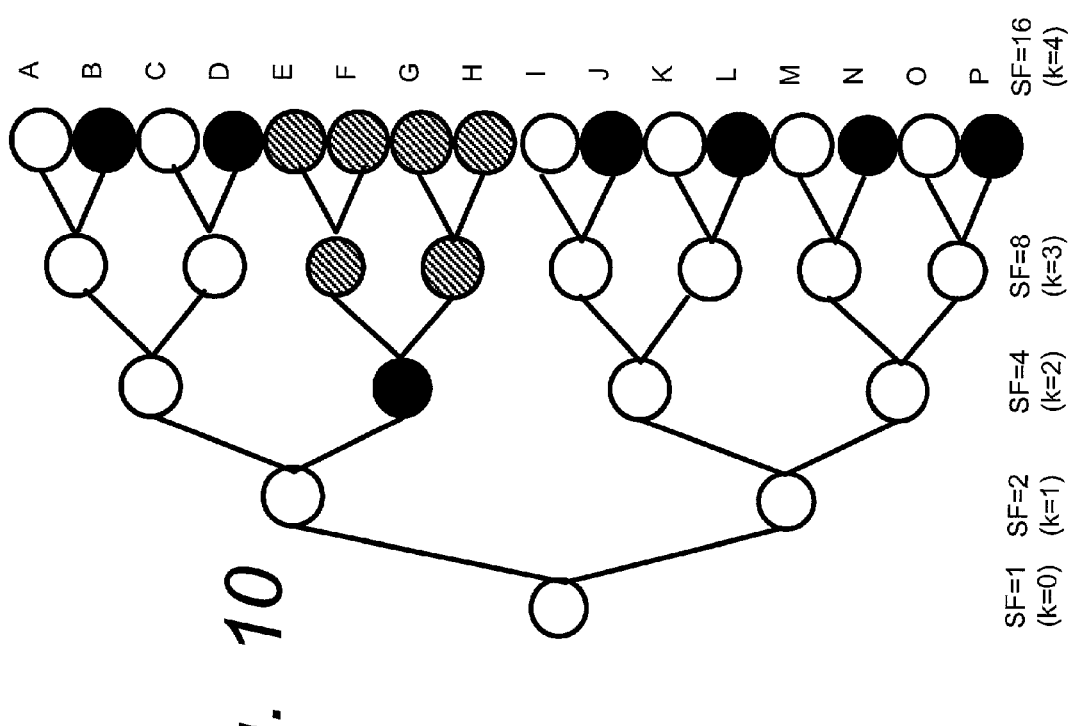

FIG. 10 shows a third example scenario of orthogonal variable spreading factor (OVSF) allocation according to the procedure of FIG. 7A. Again in FIG. 10, the black-filled circles (e.g., codes B, D, EFGH, J, L, N, and P) represent allocated codes; circles with cross-hatched interiors (e.g., codes EF, GH, E, F, G, and H) represent busy codes. In the scenario of FIG. 10 it is assumed that an incoming call (e.g., an incoming connection) requires a spreading factor of 16 (e.g., SF=16), which means that a code of level k=4 is required. The code tree of the scenario of FIG. 10 contains six free codes of level k=4, particularly the codes A, C, I, K, M, and O. In the scenario of FIG. 10, it is further assumed that it is possible to allocate codes on level k=1, 2, 3, and 4, and that the weight=1 for all codes.

In accordance with the procedure of FIG. 7A and in the context of the FIG. 10 scenario, as step 7-2 the code allocation unit 100 starts on level k=1 for a first iteration. As step 7-4, at level k=1 the code allocation unit 100 selects the code IJKLMNOP over the code ABCDEFGH because the code IJKLMNOP has four users (e.g., users of codes J, L, N, and P), whereas code ABCDEFGH has only three users (the user of codes B, D, and EFGH). When it is determined at step 7-5 that level k=1 is not the correct level corresponding to the requested spreading factor of 16 (e.g., level k=4 has not yet been reached), the code IJKLMNOP becomes the current code at step 7-10, and a second iteration of the procedure of FIG. 7A is performed.

In the second iteration of FIG. 7A using code IJKLMNOP as the current code of the FIG. 10 scenario, the codes at level k=2 are examined, e.g., code IJKL and code MNOP. At step 7-3 of the second iteration, the code IJKL is selected as the first avialable code, although both code IJKL and code MNOP each have two users. When it is determined at step 7-5 that level k=2 is not the correct level corresponding to the requested spreading factor of 16 (e.g., level k=4 has not yet been reached), the code IJKL becomes the current code at step 7-10, and a third iteration of the procedure of FIG. 7A is performed.

In the third iteration of FIG. 7A using code IJKL as the current code in the scenario of FIG. 10, the codes at level k=3 (the child codes to code IJKL) are examined, e.g., code IJ and code KL. At step 7-4 the code allocation unit 100 selects code IJ as the first avialable code, although both code IJ and code KL each have one user. When it is determined at step 7-5 that level k=3 is not the correct level corresponding to the requested spreading factor of 16 (e.g., level k=4 has not yet been reached), the code IJ becomes the current code at step 7-10, and a fourth iteration of the procedure of FIG. 7A is performed.

In the fourth iteration of FIG. 7A using code IJ as the current code in the scenario of FIG. 10, the codes at level k=4 (the child codes to code IJ) are examined, e.g., code I and code J. At step 7-3 code I is selected because it is the only code that is free. Then, when it is determined at step 7-5 that level k=4 is the correct level corresponding to the requested spreading factor of 16 (e.g., level k=4 has now been reached), the code I becomes the allocated code at step 7-8 and the procedure as applied to the scenario of FIG. 10 terminates.

FIG. 10 further illustrates that the technique of the present invention focuses on the number of users in the code tree globally, i.e., from level k=0 and downwards. This means that the technique of the present invention allocates code I in the FIG. 10 context because it is part of the code tree which has the most number of users, but still has available codes at level k=4. The result of the technique is that five users are in the IJKLMNOP subtree, while three users are in the ABCDEFGH subtree.

As an example of contrast, for the scenario of FIG. 10 the technique of Imbeni et al. (PCT/SE00/02176, WO 01/35550A1) would have allocated either code A or code C, because these codes are part of the code tree which locally has the greatest usage but still available codes of level k=4. The technique of Imbeni et al. (PCT/SE00/02176, WO 01/35550A1) thus focuses on the usage in the code tree locally, from level k=4 and upwards. Thus, in contrast to the present invention, allocation according to the technique of Imbeni et al. (PCT/SE00/02176, WO 01/35550A1) would result in four users in both the IJKLMNOP subtree and in the ABCDEFGH subtree.

Applying the technique of the present invention in the context of FIG. 10 means that, as a result of the present invention, only the three users EFGH, B, and D must terminate their connections (e.g., "hang up") to obtain a free level k=1 code. On the other hand, the technique of Imbeni et al. (PCT/SE00/02176, WO 01/35550A1) would require that four users terminate their connection in order to obtain a free level k=1 code.

If we continue with the example of FIG. 10 and add two more codes of level k=4 this will further highlight the difference between the two algorithms. The technique of the present invention will propose that the codes K and M are allocated which results in three users in the ABCDEFGH subtree and seven users in the IJKLMNOP subtree. The technique of Imbeni et al. (PCT/SE00/02176, WO 01/35550A1) will allocate the codes C and I and result in five users in both the IJKLMNOP subtree and in the ABCDEFGH subtree. Thus, to increase the probability of a free level k=1 code, for the present invention only three users must terminate their connections, but in the Imbeni technique five users must terminate their connections.

Thus, in its various aspects, without using reallocations in a UMTS system the invention improves the availability of codes for high data-rate services/connections and improves the total usage of the code tree, which means that more "erlang" can be handled. When using reallocations, the code allocation technique of the present invention reduces the need for reallocations, which means a reduction of signaling between the Node-B and the user equipment unit (UE).

Normally, only codes on certain levels in the code tree can be allocated. The technique of the present invention takes this into consideration, and optimizes the code tree based on this information. Moreover, with the present invention it is possible to give each user a unique weight in relation, e.g., to how long the user is expected to occupy the code. The weight can be calculated from such things as the type of radio access bearer that is requested, typical user behavior, and the like. Further, as a secondary option, if the number of users in two branches of the code tree are equal, as illustrated in the context of the mode of FIG. 7A, the present invention can take into consideration usage of the code tree as a factor when deciding in which part of the code tree to allocate a new code.

Although various aspects of the invention have, at some junctures above, been discussed above in the context of downlink channelization codes, it will be appreciated by those skilled in the art that the techniques of the present invention are not limited to or confined by such context, but that the techniques of the invention pertain to channelization codes generally, e.g., whether downlink or uplink.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A node of a radio access telecommunications network which allocates one of plural Orthogonal Variable Spreading Factor (OVSF) codes to a radio access connection for use as a channelization code, the plural Orthogonal Variable Spreading Factor (OVSF) codes being defined by a binary code tree structure having a root and plural code levels, each node of the tree corresponding to one code and having a spreading factor defined by its level (k) in the tree structure, and wherein, when a code of level k=i is requested for the connection, the node selects as an allocated OVSF code a free code of the $i^{th}$ level whose subtree structure from the root of the code tree has a largest combined weight, the combined weight being a sum of weights for all codes that are allocated in the subtree, wherein k and i are positive integers.

2. The apparatus of claim 1, wherein the weights are values related to duration of allocation.

3. The apparatus of claim 1, wherein the weights values which are statistically derived.

4. The apparatus of claim 1, wherein the weights are values based on service type.

5. The apparatus of claim 1, wherein the weights are values based on individual user behavior.

6. The apparatus of claim 1, wherein in selecting the allocated OVSF code the node performs the steps of:
(a) setting a start code in the code tree as a current code;
(b) selecting at least one code descendant from the current code(s) on a next active code level;
(c) from the code(s) selected in step (b), selecting at least one code which has at least one code of level i available;
(d) from the code(s) selected at step (c), selecting a code(s) which has the largest combined weight;
(e) allocating one of the code(s) selected at step (d) if level thereof is level i;
(f) if the code(s) selected at step (d) is not of level i, setting the code(s) selected at step (d) as the current code(s) and continuing with step (b).

7. The apparatus of claim 6, wherein if all codes are equally weighted, step (d) involves selecting, from the code(s) selected at step (c), a code(s) which has a greatest number of users in its subtree.

8. The apparatus of claim 6, wherein if more than one code is selected at step (d), as step (e) the allocated code is selected according to a predetermined strategy.

9. The apparatus of claim 6, wherein if more than one code is selected at step (d), as step (e), a first such code selected at step (d) is selected as the allocated code.

10. The apparatus of claim 1, wherein the node is a radio network controller (RNC) node of the radio access network.

11. A radio access telecommunications network comprising:
a radio access controller (RNC) node;
a base station node connected to the radio access controller (RNC) node;
a user equipment unit which communicates via a connection across an air interface with the base station node using an allocated Orthogonal Variable Spreading Factor (OVSF) code;
a code allocation unit at one of the nodes which allocates, for use as a channelization code, one of plural Orthogonal Variable Spreading Factor (OVSF) codes to a radio access connection as the allocated Orthogonal Variable Spreading Factor (OVSF) code, the plural Orthogonal Variable Spreading Factor (OVSF) codes being defined by a binary code tree structure having a root and plural code levels, each node of the tree corresponding to one code and having a spreading factor defined by its level (k) in the tree structure, and wherein, when a code of level k=i is requested for the connection, the node selects as the allocated OVSF code a free code of the $i^{th}$ level whose subtree structure from the root of the code tree has a largest combined weight, the combined weight being a sum of weights for all codes that are allocated in the subtree, wherein k and i are positive integers.

12. The apparatus of claim 11, wherein the weights are values related to duration of allocation.

13. The apparatus of claim 11, wherein the weights are statistically derived.

14. The apparatus of claim 11, wherein the weights are values which are based on service type.

15. The apparatus of claim 11, wherein the weights are values based on individual user behavior.

16. The apparatus of claim 11, wherein in selecting the allocated OVSF code the code allocation unit performs the steps of:
(a) setting a start code in the code tree as a current code;
(b) selecting at least one code descendant from the current code(s) on a next active code level;
(c) from the code(s) selected in step (b), selecting at least one code which has at least one code of level i available;
(d) from the code(s) selected at step (c), selecting a code(s) which has the largest combined weight;

(e) allocating one of the code(s) selected at step (d) if level thereof is level i;

(f) if the code(s) selected at step (d) is not of level i, setting the code(s) selected at step (d) as the current code(s) and continuing with step (b).

17. The apparatus of claim 16, wherein if all codes are equally weighted, step (d) involves selecting, from the code(s) selected at step (c), a code(s) which has a greatest number of users in its subtree.

18. The apparatus of claim 16, wherein if more than one code is selected at step (d), as step (e) the allocated code is selected according to a predetermined strategy.

19. The apparatus of claim 16, wherein if more than one code is selected at step (d), as step (e), a first such code selected at step (d) is selected as the allocated code.

20. The apparatus of claim 11, wherein the code allocation unit is situated at a radio network controller node.

21. A method of allocating one of plural Orthogonal Variable Spreading Factor (OVSF) codes to a connection in a radio access network for use as a channelization code, the plural Orthogonal Variable Spreading Factor (OVSF) codes being defined by a binary code tree structure having a root, each node of the tree corresponding to one code and having a spreading factor defined by its level (k) in the tree structure, and wherein, when a code of level k=i is requested for the connection, the method comprises selecting as an allocated OVSF code a free code of the $i^{th}$ level whose subtree structure from the root of the code tree has a largest combined weight, the combined weight being a sum of weights for all codes that are allocated in the subtree, wherein k and i are positive integers.

22. The method of claim 21, wherein the weights are values related to duration of allocation.

23. The method of claim 21, wherein the weights are statistically derived.

24. The method of claim 21, wherein the weights are values based on service type.

25. The method of claim 21, wherein the weights are values based on individual user behavior.

26. The method of claim 21, further comprising selecting the allocated OVSF code by performing the following steps:

(a) setting a start code in the code tree as a current code;

(b) selecting at least one code descendant from the current code(s) on a next active code level;

(c) from the code(s) selected in step (b), selecting at least one code which has at least one code of level i available;

(d) from the code(s) selected at step (c), selecting a code(s) which has the largest combined weight;

(e) allocating one of the code(s) selected at step (d) if level thereof is level i;

(f) if the code(s) selected at step (d) is not of level i, setting the code(s) selected at step (d) as the current code(s) and continuing with step (b).

27. The method of claim 26, wherein step (d) involves comprises, if all codes are equally weighted, selecting, from the code(s) selected at step (c), a code(s) which has a greatest number of users in its subtree.

28. The method of claim 26, wherein if more than one code is selected at step (d), as step (e) the allocated code is selected according to a predetermined strategy.

29. The method of claim 26, wherein if more than one code is selected at step (d), as step (e), a first such code selected at step (d) is selected as the allocated code.

30. The method of claim 21, wherein the method is performed by a radio network controller (RNC) node of the radio access network, and wherein the method further comprises:

transmitting the allocated OVSF code to a base station node; and transmitting the allocated OVSF code to a user equipment unit for use by the user equipment unit in communicating over an air interface with the base station node.

31. The method of claim 30, wherein the method further comprises transmitting the allocated OVSF code to the base station node using a NODE B APPLICATION PART (NBAP) message.

32. The method of claim 31, further comprising using one of the following NODE B APPLICATION PART (NBAP) messages to transmit the allocated OVSF code to the base station node: COMMON TRANSPORT CHANNEL SETUP REQUEST message; CELL SETUP REQUEST message; RADIO LINK SETUP REQUEST message; RADIO LINK ADDITION REQUEST message; RADIO LINK RECONFIGURATION PREPARE message, and COMPRESSED MODE PREPARE message.

33. The method of claim 30, wherein the method further comprises transmitting the allocated OVSF code to the user equipment unit using a radio resource control (RRC) message.

34. The method of claim 33, further comprising using one of the following messages to transmit the allocated OVSF code to the user equipment unit: PHYSICAL CHANNEL RECONFIGURATION message; TRANSPORT CHANNEL RECONFIGURATION message; RADIO BEARER SETUP message; RADIO BEARER RELEASE message; RADIO BEARER RECONFIGURATION message; RADIO RESOURCE CONTROL (RRC) CONNECTION SETUP message; ACTIVE SYSTEM UPDATE message; and SYSTEM INFORMATION message.

35. A node of a radio access telecommunications network which allocates one of plural Orthogonal Variable Spreading Factor (OVSF) codes to a radio access connection for use as a channelization code, the plural Orthogonal Variable Spreading Factor (OVSF) codes being defined by a binary code tree structure having a root and plural code levels, each node of the tree corresponding to one code and having a spreading factor defined by its level (k) in the tree structure, and wherein, when a code of level k=i is requested for the connection, the node selects as an allocated OVSF code a free code of the $i^{th}$ level whose subtree structure from the root of the code tree has a greatest number of users, wherein k and i are positive integers.

36. The apparatus of claim 1, wherein in selecting the allocated OVSF code the node performs the steps of:

(a) setting a start code in the code tree as a current code;

(b) selecting at least one code descendant from the current code(s) on a next active code level;

(c) from the code(s) selected in step (b), selecting at least one code which has at least one code of level i available;

(d) from the code(s) selected at step (c), selecting a code(s) which has the greatest number of users;

(e) allocating one of the code(s) selected at step (d) if level thereof is level i;

(f) if the code(s) selected at step (d) is not of level i, setting the code(s) selected at step (d) as the current code(s) and continuing with step (b).

37. The apparatus of claim 36, wherein if more than one code is selected at step (d), as step (e) the allocated code is selected according to a predetermined strategy.

38. The apparatus of claim 36, wherein if more than one code is selected at step (d), as step (e), a first such code selected at step (d) is selected as the allocated code.

39. The apparatus of claim 35, wherein the node is a radio network controller (RNC) node of the radio access network.

40. A method of allocating one of plural Orthogonal Variable Spreading Factor (OVSF) codes to a connection in a radio access network for use as a channelization code, the plural Orthogonal Variable Spreading Factor (OVSF) codes being defined by a binary code tree structure having a root, each node of the tree corresponding to one code and having a spreading factor defined by its level (k) in the tree structure, and wherein, when a code of level k=i is requested for the connection, the method comprises selecting as an allocated OVSF code a free code of the $i^{th}$ level whose subtree structure from the root of the code tree has a greatest number of users, wherein k and i are positive integers.

41. The method of claim 40, further comprising selecting the allocated OVSF code by performing the following steps:
  (a) setting a start code in the code tree as a current code;
  (b) selecting at least one code descendant from the current code(s) on a next active code level;
  (c) from the code(s) selected in step (b), selecting at least one code which has at least one code of level i available;
  (d) from the code(s) selected at step (c), selecting a code(s) which has the greatest number of users;
  (e) allocating one of the code(s) selected at step (d) if level thereof is level i;
  (f) if the code(s) selected at step (d) is not of level i, setting the code(s) selected at step (d) as the current code(s) and continuing with step (b).

42. The method of claim 41, wherein if more than one code is selected at step (d), as step (e) the allocated code is selected according to a predetermined strategy.

43. The method of claim 41, wherein if more than one code is selected at step (d), as step (e), a first such code selected at step (d) is selected as the allocated code.

* * * * *